UNITED STATES PATENT OFFICE.

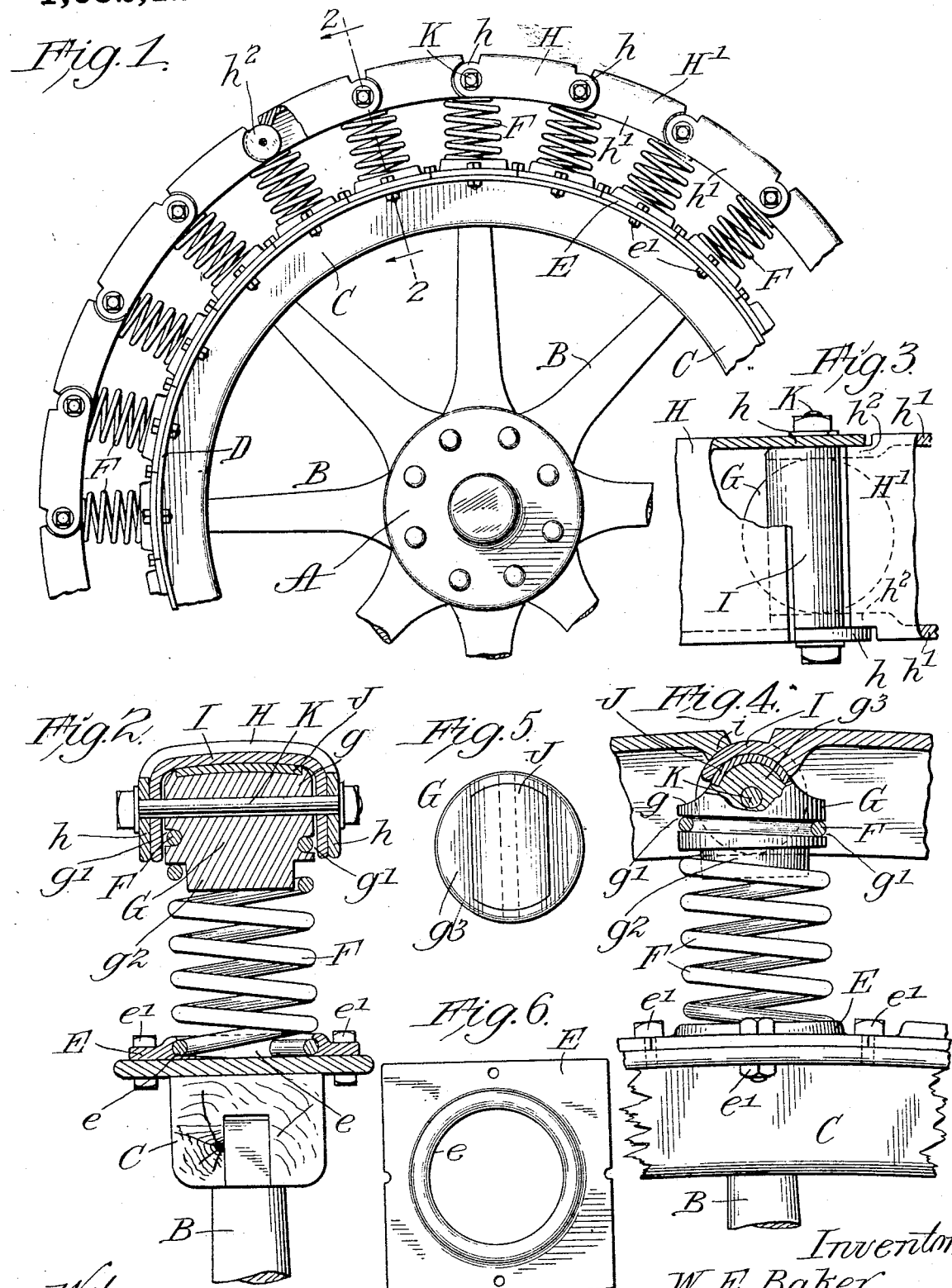
W. E. BAKER.
SPRING TIRE.
APPLICATION FILED JUNE 29, 1912.
1,052,122.
Patented Feb. 4, 1913.

WILLIAM E. BAKER, OF SCRANTON, PENNSYLVANIA.

SPRING-TIRE.

1,052,122.  Specification of Letters Patent.  Patented Feb. 4, 1913.

Application filed June 29, 1912. Serial No. 706,652.

*To all whom it may concern:*

Be it known that I, WILLIAM E. BAKER, a citizen of the United States, residing in Scranton, in the county of Lackawanna and State of Pennsylvania, have invented certain new and useful Improvements in Spring-Tires, of which the following is a specification.

The object of my invention is to provide an efficient substitute for the pneumatic rubber tires commonly used on the wheels of automobiles and other vehicles. Such rubber tires are very expensive, are not durable, and when punctured or ruptured are rendered inoperative.

According to my invention, I provide wheels of the class above mentioned with radially arranged springs which are attached to the periphery of the felly and support a metallic tire or tread made in sections, hinged together, and pivotally connected with head blocks supported by the springs. The tread sections overlap each other and have segmental bearing portions which bear on correspondingly curved surfaces on the head blocks.

In the accompanying drawings:—Figure 1 shows a side elevation of a part of an automobile wheel embodying my improvements, with parts broken away in order to better illustrate other parts. Fig. 2 shows a transverse section on the line 2—2 of Fig. 1. Fig. 3 is a detail view, partly in plan and partly in section, illustrating the manner in which the tread sections are overlapped and connected. Fig. 4 is a view on an enlarged scale, partly in side elevation and partly in section, of a portion of the wheel, showing the manner in which two overlapping tread sections are supported on the wheel. Fig. 5 is a detail plan view of the top of one of the head blocks. Fig. 6 is a plan view of one of the foot plates.

The hubs A, spokes B and felly C of the wheel may be of any usual construction. Surrounding the felly C is a metallic felly-band D to which is secured a series of foot plates E for the radially arranged spiral springs F. Each foot plate, as shown in Figs. 2 and 6, is formed with a socket $e$ for the foot or inner convolution of a spring F and each plate is preferably secured to the felly-band by four screws or bolts $e'$, the bolt holes being preferably formed as shown in Fig. 6 so that when the foot plates are assembled on the wheel a single bolt or screw may serve to firmly connect two adjacent plates. By providing the foot plates with threaded sockets $e$, as indicated in Fig. 2, the springs may be very easily connected with them and firmly held in radial condition. The outer ends of the springs carry head blocks G, there being a head block for each spring and each having a cylindrical portion $g$ formed with a threaded groove $g'$ to receive the outer convolution of the spring. In this way the springs may be firmly connected with the head blocks. Each head block has a boss $g^2$ of relatively small diameter which projects into the spring and serves to brace its outer end and stiffen it against lateral movement.

The tread of the tire is formed in sections H, H'. The sections H are U-shape in cross section and have two ears $h$ at each end projecting from each side, said ears forming continuations of the sides of the sections. The sections H' are also U-shape in cross section, their side flanges $h'$ being parallel and alined with the side flanges of the sections H and also with the ears $h$ thereof. At each end each section H' is formed with ears $h^2$ connected with the side flanges $h'$, as shown in Fig. 3, but being closer together than said flanges and these ears are overlapped by the ears $h$ of the section H. Each section H' has at each end a segmental portion I which extends over the top of a head block G, which latter is formed with a correspondingly curved bearing surface $g^3$ which is preferably provided with a wearing piece J. The section H is formed with a transverse rib $i$ which rests on the top of the segmental piece I.

The several tread sections and the head blocks are connected by bolts K which extend through the ears $h$ and $h^2$ of the sections H, H' and through the upper portions of the head blocks. In this way two tread sections where they join are pivotally connected to each other and to a head block.

The parts hereinbefore described may be very easily assembled or taken apart but when assembled in the manner specified, they constitute a strong, durable and efficient tire for automobiles and other vehicles. Normally the springs F hold the tread sections in circular series concentric with the axis of the wheel, but when any portion of the wheel is subjected to irregular pressure that section yields, distributing the strain to adjoining sections and without putting undue strain on any part of the wheel. Even when the wheel meets an abrupt obstruction and one or more sections of the tread are subjected to a sudden jar or thrust, the tire will respond quickly and yield sufficiently to relieve the shock. The springs may be of such size and strength as to resist all undue sidewise movement of the tread, the head blocks assisting the springs in performing this function.

I claim as my invention:

The combination with a wheel felly of a series of foot plates placed close together with their edges in contact and which are formed with threaded sockets, means for securing the foot plates to the felly, a sectional tread surrounding the felly, radially arranged spiral springs having their inner convolutions detachably engaged with the threaded sockets of the foot plates, head blocks having threaded pieces engaged by the outer convolutions of the springs, and detachable transversely arranged bolts extending through the head blocks and through each pair of tread sections and detachably connecting them.

In testimony whereof, I have hereunto subscribed my name.

WILLIAM E. BAKER.

Witnesses:
R. U. CAPWELL,
W. S. BEVAN.